United States Patent
Cowan et al.

(10) Patent No.: US 7,752,459 B2
(45) Date of Patent: Jul. 6, 2010

(54) POINTGUARD: METHOD AND SYSTEM FOR PROTECTING PROGRAMS AGAINST POINTER CORRUPTION ATTACKS

(75) Inventors: Stanley Crispin Cowan, Portland, OR (US); Seth Richard Arnold, Lake Owego, OR (US); Steven Michael Beattie, Portland, OR (US); Perry Michael Wagle, Hillsboro, OR (US)

(73) Assignee: Novell, Inc., Provo, UT (US)

( * ) Notice: Subject to any disclaimer, the term of this patent is extended or adjusted under 35 U.S.C. 154(b) by 1348 days.

(21) Appl. No.: 10/313,940

(22) Filed: Dec. 6, 2002

(65) Prior Publication Data

US 2003/0182572 A1 Sep. 25, 2003

Related U.S. Application Data

(60) Provisional application No. 60/337,199, filed on Dec. 6, 2001.

(51) Int. Cl.
*G06F 11/30* (2006.01)
*G06F 12/14* (2006.01)

(52) U.S. Cl. .................. 713/190; 711/163; 711/164

(58) Field of Classification Search .................. 713/190
See application file for complete search history.

(56) References Cited

U.S. PATENT DOCUMENTS

| | | | |
|---|---|---|---|
| 4,562,305 A | 12/1985 | Gaffney, Jr. | |
| 4,870,704 A | 9/1989 | Matelan et al. | |
| 4,893,234 A | 1/1990 | Davidson et al. | |
| 4,941,176 A | 7/1990 | Matyas et al. | |
| 5,481,706 A | 1/1996 | Peek | |
| 5,583,988 A * | 12/1996 | Crank et al. ................. | 714/48 |
| 5,689,710 A * | 11/1997 | Stanley et al. ............... | 719/331 |
| 5,802,367 A | 9/1998 | Held et al. | |
| 5,835,722 A | 11/1998 | Bradshaw et al. | |
| 5,950,221 A * | 9/1999 | Draves et al. ............... | 711/100 |
| 5,951,633 A | 9/1999 | Polcyn | |
| 6,118,869 A | 9/2000 | Kelem et al. | |
| 6,272,637 B1 | 8/2001 | Little et al. | |
| 6,684,389 B1 | 1/2004 | Tanaka et al. | |
| 6,986,043 B2 | 1/2006 | Andrew et al. | |
| 6,996,808 B1 * | 2/2006 | Niewiadomski et al. .... | 717/130 |
| 7,124,170 B1 * | 10/2006 | Sibert ......................... | 709/216 |
| 2003/0065929 A1 * | 4/2003 | Milliken ..................... | 713/189 |

(Continued)

OTHER PUBLICATIONS

Cowan, Crispin, "StackGuard-protected Linux and a New StackGuard Compiler", www.redhat.com/archives/linux-security/1998-September/msg00007.html , Aug. 27, 1998.*

(Continued)

*Primary Examiner*—Farid Homayounmehr
(74) *Attorney, Agent, or Firm*—Marger Johnson & McCollom PC

(57) ABSTRACT

To protect computer programs against security attacks that attempt to corrupt pointers within the address space of the program, the value of a pointer is encrypted each time the pointer is initialized or modified, and then the value is decrypted before use, i.e., each time the pointer is read. Preferably, the encrypting and decrypting steps are effected by instructions generated by a compiler during compilation of the program. One convenient method of implementing the encrypting and decrypting steps is by XOR'ing the pointer with a predetermined encryption key value, which could be specially selected or selected at random.

16 Claims, 6 Drawing Sheets

U.S. PATENT DOCUMENTS

2003/0182572 A1* 9/2003 Cowan et al. ............... 713/200
2007/0024693 A1* 2/2007 Anderson et al. ........... 347/213

OTHER PUBLICATIONS

Cowan, Crispin, "Immunixing Open Source", WireX Communications, Inc., 2000, pp. 1-3.

Cowan, Crispin, "Immunixing Open Source: The Other Reason Source Availability Helps Security", WireX Communications, Inc., 2000, pp. 1-59.

Cowan, Crispin, "ImmuniX OS Security Alert", Linux Weekly News, 1999, pp. 1-2.

Cowan, StackGuard: Automatic Adaptive Detection and Prevention of Buffer-Overflow Attacks, Proceedings of the 7th USENIX Security Symposium, 1998, 16 pages.

Cowan, "StackGuard"www.unsenix.org/events/sec01/full_papers/frantzen/frantzen_html, May 12, 2001.

Frantzen et al., "StackGhost; Hardware Facilitated Stack Protection", USENIX Security Symposium, May 2001.

Lam3rz Group, "Bypassing Stackguard and Stackshield", Phrack Magazine, vol. Oxa, Issue Ox38, 2000, pp.1-9.

Lee et al., "Encoded Program Counter: Self Protection from Buffer Overflow Attacks", International Conference on Internet Computing, 2000, pp. 387-394.

U.S. Provisional Patent Application No. 60/325,949 filed Sep. 28, 2001 entitled "Encryption-PC".

* cited by examiner

POINTGUARD: METHOD AND SYSTEM FOR PROTECTING PROGRAMS AGAINST POINTER CORRUPTION ATTACKS

RELATED APPLICATIONS

This application claims the benefit of U.S. provisional application No. 60/337,199 filed Dec. 6, 2001.

FEDERALLY SPONSORED RESEARCH OR DEVELOPMENT

DARPA contract no. N66001-00-C-8032.

COPYRIGHT NOTICE

© 2002 WireX Communications, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

The present invention relates to protecting programs against most methods of security attack that attempt to corrupt pointers within the address space of the program. Such attack methods include buffer overflows, in which a buffer within the program is filled with more data than it can accommodate, corrupting whatever state is adjacent to the buffer in the programs address space, and so-called printf format vulnerabilities, in which the attacker can induce a call to a printf-like function within the program to write to arbitrary locations in the program.

BACKGROUND OF THE INVENTION

A primary way for an attacker to corrupt a privileged program's behavior is to corrupt code and data pointers stored in the program's address space, and then cause the program to depend on those corrupted values. Below we describe several variations on this attack. Below we present past defenses against these vulnerabilities.

Variations on the Vulnerability Problem

These vulnerabilities are unfortunately common in C programs, due to C's weak typing system. C is a widely used programming language in both systems and applications programs. The variations on this attack method are:

How to corrupt a variable: The C programming language, which is widely used for both systems and applications programming, is weakly typed, leading to a variety of ways that the attacker can fool the program into corrupting itself, such as buffer overflows and printf format bugs. We survey these methods below.

Possible effects of corrupting a variable: By changing the value of some variable in a program, the attacker can compromise the function of the program in various ways, causing the privileged program to do something unanticipated by the programmer and advantageous to the attacker. We survey these possible effects below.

Ways to Corrupt a Variable

There are a variety of ways for the attacker to corrupt a variable in a victim program. By far the two most common methods are buffer overflows and printf format bugs:

Buffer overflows: It is common to C programs to not do strict bounds checking on the size of input strings provided to the program. If the attacker provides more input than the program provided for, then the buffer is overflowed, and the attacker's input overwrites whatever is adjacent to the buffer. Attackers commonly look for programs that have overflowable buffers adjacent to security-sensitive variables. Below we detail the problems and previous solutions for buffer overflow vulnerabilities.

Printf format string bugs: This is a new form of vulnerability in C programs that has rapidly become common after initial discovery in spring 2000. When it occurs, it allows the attacker to cause calls to the printf function to write an arbitrary word to an arbitrary location in the program's address space. Below we give specific details on printf format string vulnerabilities.

Possible Effects of Corrupting a Variable

By corrupting a variable in the program's state, the attacker can cause the program to behave in unexpected ways. In principle, the attacker can cause arbitrary behavior by changing an arbitrary variable. In practice, the variable that can be modified is often determined by the nature of the defect in the victim program, and so the attacker does not have total choice over which variable to change. Furthermore, most programs do not have functionality of interest to the attacker, and so causing aberrant behavior in the program does not satisfy the attacker's goals.

For these reasons, the attacker most desires to get the victim program to execute arbitrary code, referred to as "shell code" in the hacker underground community. To get the program to execute "shell code," the attacker must modify a code pointer (a pointer that the program expects to point to legitimate code) such that the code pointer points to code the attacker would like executed. Once the code pointer has been thus modified, at some later point in execution the program dereferences the corrupted code pointer, and instead of jumping to the intended code, the program jumps to the attacker's "shell code." There are three kinds of code pointers that the attacker can modify:

Activation records: Each time a function is called, it lays down an activation record on the stack that includes, among other things, the return address that the program should jump to when the function completes. Attacks that corrupt activation record return addresses overflow automatic variables, i.e., buffers local to the function, as shown in FIG. 1. By corrupting the return address in the activation record, the attacker causes the program to jump to attack code when the victim function returns and dereferences the return address. This form of buffer overflow is called a "stack smashing attack" and is the most popular code pointer for attackers to try to modify.

Function pointers: "Void (* foo)( )" declares the variable foo which is of type "pointer to function returning void." Function pointers can be allocated anywhere (stack, heap, static data area) and so the attacker need only find an overflowable buffer adjacent to a function pointer in any of these areas and overflow it to change the function pointer. Some time later, when the program makes a call through this function pointer, it will instead jump to the attacker's desired location. An example of this kind of attack appeared in an attack against the superprobe program for Linux.

Longjmp buffers: C includes a simple checkpoint/rollback system called setjmp/longjmp. The idiom is to say "setjmp (buffer)" to checkpoint, and say "longjmp(buffer)" to go back to the checkpoint. However, if the attacker can corrupt the state of the buffer, then "longjmp(buffer)" will jump to the attacker's code instead. Like function pointers, longjmp buffers can be allocated anywhere, so the attacker need only find an adjacent overflowable buffer. An example of this form of attack appeared against Perl 5.003. The attack first corrupted a longjmp buffer used to recover when buffer overflows are detected, and then induces the recovery mode, causing the Perl interpreter to jump to the attack code.

The attacker may further attempt an indirect method to corrupt a code pointer by corrupting some other pointer (typically a string pointer) to point at or near a code pointer. When the program then writes data back to the other pointer, it has the effect of corrupting the code pointer.

It also matters where the code pointer to be corrupted is located: on the stack, in the heap, or in the static data area. However, this distinction only matters with respect to various kinds of defenses that can be employed against code pointer corruption, and so we will address it below.

Previous Defenses

Previous defenses against code pointer corrupting come in several forms. In the sections below we describe the following: (1) simple expedients of writing correct code; (2) methods that make various segments of memory non-executable; (3) array bounds checking methods; (4) type-safe programming languages; and (5) code pointer integrity checking methods, which is the same family as our PointGuard invention.

Writing Correct Code

"To err is human, but to really foul up requires a computer."—Anon. Writing correct code is a laudable but remarkably expensive proposition, especially when writing in a language such as C that has error-prone idioms such as null-terminated strings and a culture that favors performance over correctness. Despite a long history of understanding of how to write secure programs vulnerable programs continue to emerge on a regular basis. Thus some tools and techniques have evolved to help novice developers write programs that are somewhat less likely to contain buffer overflow vulnerabilities.

The simplest method is to grep the source code for highly vulnerable library calls such as strcpy and sprintf that do not check the length of their arguments. Versions of the C standard library have also been developed that complain when a program links to vulnerable functions like strcpy and sprintf.

Code auditing teams have appeared with an explicit objective of auditing large volumes of code by hand, looking for common security vulnerabilities such as buffer overflows and file system race conditions. However, buffer overflow vulnerabilities can be subtle. Even defensive code that uses safer alternatives such as strncpy and snprintf can contain buffer overflow vulnerabilities if the code contains an elementary off-by-one error. For instance, the lprm program was found to have a buffer overflow vulnerability, despite having been audited for security problems such as buffer overflow vulnerabilities.

To combat the problem of subtle residual bugs, more advanced debugging tools have been developed, such as fault injection tools. The idea is to inject deliberate buffer overflow faults at random to search for vulnerable program components. There are also static analysis tools emerging that can detect many buffer overflow vulnerabilities.

While these tools are helpful in developing more secure programs, C semantics do not permit them to provide total assurance that all buffer overflows have been found. Debugging techniques can only minimize the number of buffer overflow vulnerabilities, and provide no assurances that all the buffer overflow vulnerabilities have been eliminated. Thus, for high assurance, protective measures such as those described below should be employed unless one is very sure that all potential buffer overflow vulnerabilities have been eliminated.

Non-Executable Memory Segments

The general concept is to make the data segment of the victim program's address space non-executable, making it impossible for attackers to execute the code they inject into the victim program's input buffers. This is actually the way that many older computer systems were designed, but more recent UNIX and MS Windows systems have come to depend on the ability to emit dynamic code into program data segments to support various performance optimizations. Thus one cannot make all program data segments non-executable without sacrificing substantial program compatibility.

However, one can make the stack segment non-executable and preserve most program compatibility. Kernel patches are available for both Linux and Solaris that make the stack segment of the program's address space non-executable. Since virtually no legitimate programs have code in the stack segment, this causes few compatibility problems. There are two exceptional cases in Linux where executable code must be placed on the stack:

Signal delivery: Linux delivers UNIX signals to processes by emitting code to deliver the signal onto the process's stack and then inducing an interrupt that jumps to the delivery code on the stack. The non-executable stack patch addresses this by making the stack executable during signal delivery.

GCC trampolines: There are indications that gcc places executable code on the stack for "trampolines." However, in practice disabling trampolines has never been found to be a problem; that portion of gcc appears to have fallen into disuse.

The protection offered by non-executable stack segments is highly effective against attacks that depend on injecting attack code into automatic variables but provides no protection against other forms of attack. Attacks exist that bypass this form of defense by pointing a code pointer at code already resident in the program. Other attacks could be constructed that inject attack code into buffers allocated in the heap or static data segments.

Array Bounds Checking

While injecting code is optional for a buffer overflow attack, the corruption of control flow is essential. Thus unlike non-executable buffers, array bounds checking completely stops buffer overflow vulnerabilities and attacks. If arrays cannot be overflowed at all, then array overflows cannot be used to corrupt adjacent program state.

To implement array bounds checking, then all reads and writes to arrays need to be checked to ensure that they are within range. The direct approach is to check all array references, but it is often possible to employ optimization techniques to eliminate many of these checks. There are several approaches to implementing array bounds checking, as exemplified by the following projects.

Compaq C Compiler

The Compaq C compiler for the Alpha CPU (cc on Tru64 UNIX, ccc on Alpha Linux) supports a limited form of array bounds checking when the "-check_bounds" option is used. The bounds checks are limited in the following ways:

only explicit array references are checked, ie., "a" is checked, while "*(a+3)" is not since all C arrays are converted to pointers when passed as arguments, no bounds checking is performed on accesses made by subroutines dangerous library functions (i.e., strcpy( )) are not normally compiled with bounds checking, and remain dangerous even with bounds checking enabled Because it is so common for C programs to use pointer arithmetic to access arrays, and to pass arrays as arguments to functions, these limitations are severe. The bounds checking feature is of limited use for program debugging, and no use at all in assuring that a program's buffer overflow vulnerabilities are not exploitable.

Jones & Kelly: Array Bounds Checking for C

Richard Jones and Paul Kelly developed a gcc patch that does full array bounds checking for C programs. Compiled programs are compatible with other gcc modules, because they have not changed the representation of pointers. Rather, they derive a "base" pointer from each pointer expression, and check the attributes of that pointer to determine whether the expression is within bounds.

The performance costs are substantial: a pointer-intensive program (ijk matrix multiply) experienced 30× slowdown, Since slowdown is proportionate to pointer usage, which is quite common in privileged programs, this performance penalty is particularly unfortunate.

The compiler did not appear to be mature; complex programs such as elm failed to execute when compiled with this compiler. However, an updated version of the compiler is being maintained, and it can compile and run at least portions of the SSH software encryption package. Throughput experiments with the updated compiler and software encryption using SSH showed a 12× slowdown (see below for comparison).

Purify: Memory Access Checking

Purify is a memory usage debugging tool for C programs. Purify uses "object code insertion" to instrument all memory accesses. After linking with the Purify linker and libraries, one gets a standard native executable program that checks all of its array references to ensure that they are legitimate. While Purify-protected programs run normally without any special environment, Purify is not actually intended as a production security tool: Purify protection imposes a 3 to 5 times slowdown.

Type-Safe Languages

Buffer overflow vulnerabilities result from the lack of type safety in C. If only type-safe operations can be performed on a given variable, then it is not possible to use creative input applied to variable foo to make arbitrary changes to the variable bar. If new, security-sensitive code is to be written, it is recommended that the code be written in a type-safe language such as Java or ML.

Unfortunately, there are millions of lines of code invested in existing operating systems and security-sensitive applications, and the vast majority of that code is written in C. This paper is primarily concerned with methods to protect existing code from buffer overflow attacks.

However, it is also the case that the Java Virtual Machine (JVM) is a C program, and one of the ways to attack a JVM is to apply buffer overflow attacks to the JVM itself. Because of this, applying buffer overflow defensive techniques to the systems that enforce type safety for type-safe languages may yield beneficial results.

Defenses Specific to Printf Format String Vulnerabilities

In June 2000, a major new class of vulnerabilities called "format bugs" was discovered. The problem is that there exists a % n format token for C's printf format strings that commands printf to write back the number of bytes formatted so far to the corresponding argument to printf, presuming that the corresponding argument exists, and is of type int *. This becomes a security issue if a program permits un-filtered user input to be passed directly as the first argument to printf, and thus forms a new way for attackers to write into the program's address space, and thus modify a pointer value.

This is a common vulnerability because of the (previously) wide-spread belief that format strings are harmless. As a result, literally dozens of format bug vulnerabilities have been discovered in common tools in the ensuing four months.

The abstract cause for format bugs is that C's argument passing conventions are type-unsafe. In particular, the varargs mechanism allows functions to accept a variable number of arguments (e.g., printf) by "popping" as many arguments off the call stack as they wish, trusting the early arguments to indicate how many additional arguments are to be popped, and of what type.

A variety of solutions exist to address format bugs. Various static analysis tools can detect some instances of format bugs, at the expense of false reports of some format bugs, and missing some other instances of format bugs, making the tools costly to use. Our own FormatGuard tool uses argument counting to dynamically detect attempts to exploit format bugs. Full bounds checking as in Jones & Kelly (see above) and type safe languages (see above) stops format bugs, with the usual limitation that full bounds checking is difficult and expensive for C programs.

Code Pointer Integrity Checking

The goal of code pointer integrity checking is subtly different from bounds checking. Instead of trying to prevent corruption of code pointers (see above) code pointer integrity checking seeks to detect that a code pointer has been corrupted before it is dereferenced. Thus while the attacker succeeds in corrupting a code pointer, the corrupted code pointer will never be used because the corruption is detected before each use.

Code pointer integrity checking has the disadvantage relative to bounds checking that it does not perfectly solve the buffer overflow problem; overflows that affect program state components other than code pointers will still succeed. However, it has substantial advantages in terms of performance, compatibility with existing code, and implementation effort.

Code pointer integrity checking has been studied at three distinct levels of generality. Snarskii developed a custom implementation of libc for FreeBSD that introspects the CPU stack to detect buffer overflows, described below. Our own StackGuard project produced a compiler that automatically generates code to perform integrity checking on function activation records, described below.

Hand-Coded Stack Introspection

Snarskii developed a custom implementation of libc for FreeBSD that introspects the CPU stack to detect buffer overflows. This implementation was hand-coded in assembler, and only protects the activation records for the functions within the libc library. Snarskii's implementation is effective as far as it goes, and protects programs that use libc from vulnerabilities within libc, but does not extend protection to vulnerabilities in any other code.

StackGuard: Compiler-Generated Activation Record Integrity Checking

StackGuard is a compiler technique for providing code pointer integrity checking to the return address in function activation records. StackGuard is implemented as a small patch to gcc that enhances the code generator for emitting code to set up and tear down functions. The enhanced setup code places a "canary" word (a direct descendant of the Welsh miner's canary) next to the return address on the stack, as shown in FIG. 2. The enhanced function tear down code first checks to see that the canary word is intact before jumping to the address pointed to by the return address word. Thus if an attacker attempts a "stack smashing" attack as shown in FIG. 1, the attack will be detected before the program ever attempts to dereference the corrupted activation record.

Critical to the StackGuard "canary" approach is that the attacker is prevented from forging a canary by embedding the canary word in the overflow string. StackGuard employs two alternative methods to prevent such a forgery:

Terminator Canary: The terminator canary is comprised of the common termination symbols for C standard string library functions; 0 (null), CR, LF, and −1 (EOF). The attacker cannot use common C string libraries and idioms to embed these symbols in an overflow string, because the copying functions will terminate when they hit these symbols.

Random Canary: The canary is simply a 32-bit random number chosen at the time the program starts. The random canary is a secret that is easy to keep and hard to guess, because it is never disclosed to anyone, and it is chosen anew each time the program starts.

StackGuard XOR Random Canary

In October 1999, Mariusz Woloszyn <emsi@it.pl> discovered a method to bypass StackGuard's random and terminator canary defenses under special circumstances. Consider this vulnerable code:

```
Foo (char * arg) {
    char *   p = arg;    // a vulnerable pointer
    char a[25];          // the buffer that makes the pointer vulnerable
    gets(a);             // using gets( ) makes you vulnerable
    gets(p);             // this is the good part
}
```

In attacking this code, the attacker first overflows the buffer a[ ] with a goal of changing the value of the char * p pointer. Specifically, the attacker can cause the p pointer to point anywhere in memory, but especially at a return address record in an activation record. When the program then takes input and stores it where p points, the input data is stored where the attacker said to store it.

Wosczin had, in effect, discovered another way to make arbitrary changes to a victim program's address space (the others being buffer overflows and printf format string vulnerabilities). In response to this, Crispin Cowan and Steve Beattie (employed at WireX at the time) invented both the PointGuard "zero space canary" (which we will describe below) and the XOR Random Canary, which we published in November 1999 http://lwn.net/1999/1111/a/stackguard.html The XOR Random Canary is a new method to preserve the integrity of both the activation record's return address, and the canary. Like the StackGuard random canary mechanism described above, we choose a random canary word at exec ( ) time, but we also XOR the canary with the return address word, so that the return address is bound to the random canary value. The exact procedure is as follows:

Setting up an activation record when calling a function:
1. push the return address
2. look up the random canary word for the current function
3. XOR the random canary word with the return address
4. store the result immediately below the return address in the activation record Tearing down an activation record when returning from a function:
1. fetch the canary word from memory
2. XOR the memory canary word with the return address on the stack
3. compare the result with the random canary word associated with the current function The result of this method is that we have the same protection as with the classic Random canary, and also the property that the attacker cannot modify the return address without invalidating the canary word.

As in the random canary, a variation on this idea is to associate a different canary word with each function in the program. This provides a degree of resistance to vulnerabilities that might allow the attacker to learn the value of the canary word. In another variation, we choose only a fixed number of canary words (e.g., 128), assign each function in the program an ordinal number, and then associate the random canary number from the canary table by computing the index from the ordinal number modulus the size of the table.

Lee and Tyagi

In June 2000 Lee and Tyagi published a paper in which they propose a CPU architecture enhanced to encrypt the PC (program counter). Lee and Tyagi propose that an encoding function be included in the CPU hardware, and that this hardware decodes the encrypted value just before loading it into the CPU. Their proposed system employed some unusual features in the cryptography to attempt to proactively detect corrupted PC values, rather than just allowing the program to jump to a random location and hoping that it probably will crash.

SUMMARY OF THE INVENTION

One aspect of the present invention is a method to protect all pointers through encryption (not just code pointers). In one presently preferred embodiment, the method is implemented using purely compiler means, so that it will work on standard CPU architectures with no hardware enhancements required.

The design is for the compiler to emit instructions to encrypt the value of a pointer each time the value of the pointer is initialized or modified, and instructions to decrypt the value each time it is read.

"Encryption" and "decryption" can be performed by XOR'ing the pointer with a random "canary" value, similar to the XOR Random Canary (see above). However, any form of reasonably secure/fast encryption can be used.

This encryption of pointer values is effective against any of the techniques which seek to modify pointers in ways unanticipated by the programmer, including buffer overflows and printf format bugs, as described earlier. This is because all of these methods for corrupting pointer values do not go through the encryption process, and thus when the pointer is used, the program will attempt to decrypt an unencrypted value. The result will be a random pointer value, which will cause the program to access a random location. This will most likely cause the program to immediately crash, and certainly will not allow the attacker to cause any particular behavior in the program other than simply halting. Thus the attacker cannot exploit unconstrained pointer manipulation to gain specific control of a program.

FIG. 3 shows how a pointer is conventionally dereferenced to access data at location 0×1234. FIG. 4 shows this conventional system under attack, corrupting the pointer to change its value to 0×1340, where the attacker's malicious data resides.

FIG. 5 shows a "PointGuard-enhanced" system dereferencing the same pointer to access the same location. "PointGuard" is the name of one commercial embodiment of the invention. However, the present invention is in no way limited to that embodiment; as described herein, it can be implemented in various ways. In this illustrative example, the encrypted pointer has a value of 0×7239, but when decrypted as the pointer value is loaded into the CPU registers, it becomes 0x1234 as before. FIG. 6 shows the PointGuard system under the same pointer corruption attack. The attacker has changed the pointer value to 0x1340 as before, but when 0x1340 is decrypted, it becomes a random value, and thus the CPU attempts to access a random location, most likely causing the program to crash. Crashing is the desired outcome, as it prevents the attacker from taking control of the victim program.

Below we describe choices of where to implement the encryption and decryption of pointer values. Below we also describe how to mix PointGuard code and non-PointGuard code. Again, we refer to PointGuard merely as a convenient shorthand reference to one embodiment of the invention which we use to illustrate the invention, not to limit the scope of the claims.

Additional aspects and advantages of this invention will be apparent from the following detailed description of preferred embodiments thereof, which proceeds with reference to the accompanying drawings.

DETAILED DESCRIPTION OF PREFERRED EMBODIMENTS

Where to Perform Encryption and Decryption

Figure 1:
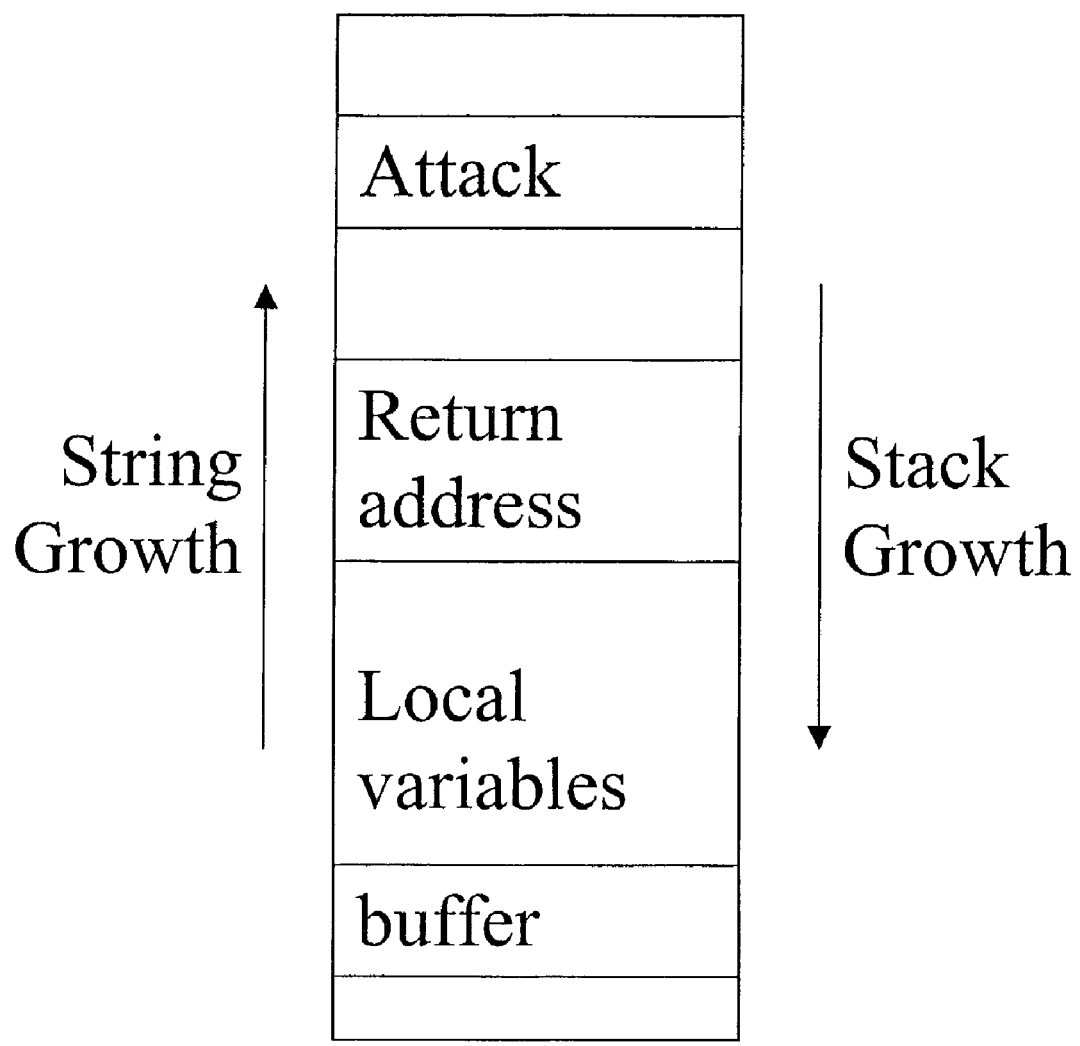
FIG. 1 is a buffer overflow attack against activation record.
Figure 2:
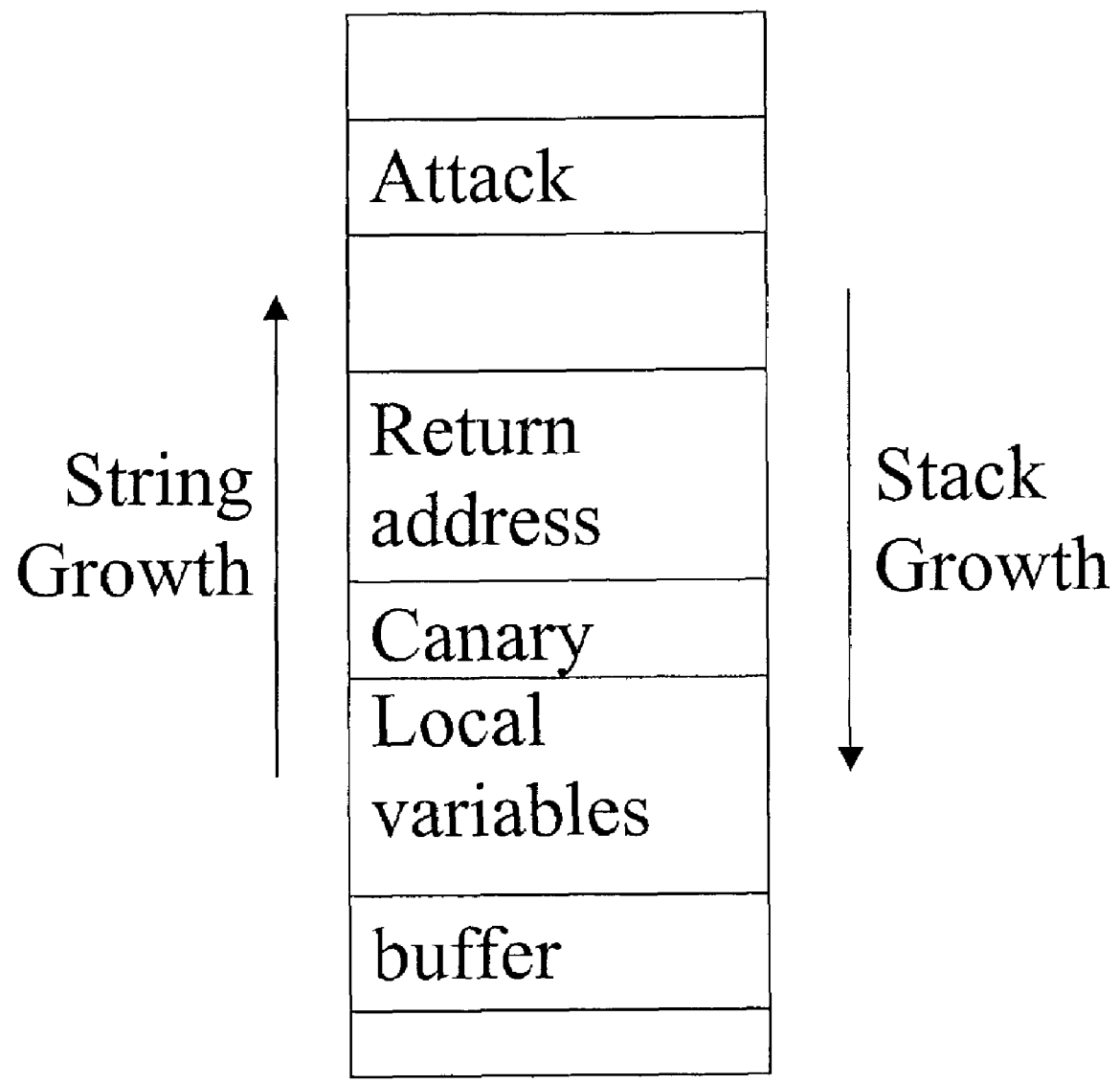
FIG. 2 is a StackGuard defense against stack-smashing attack.
Figure 3:
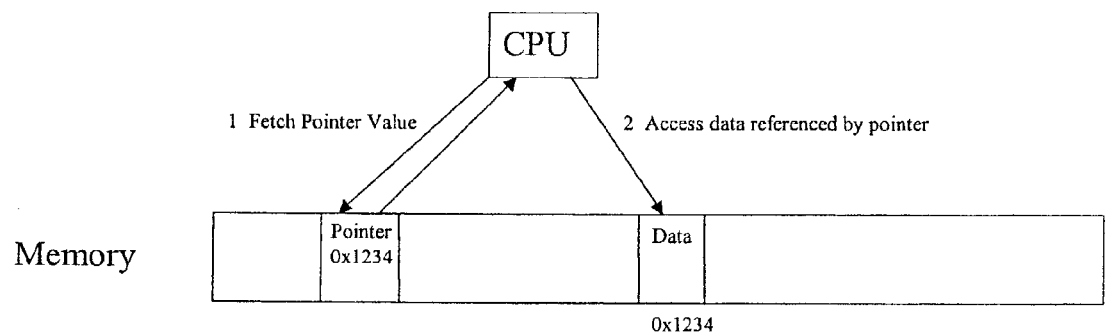
FIG. 3 is a conventional pointer dereference.
Figure 4:
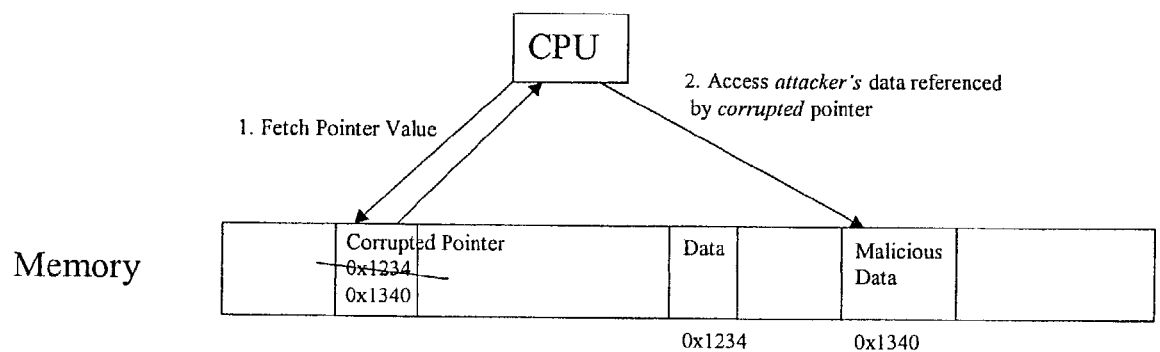
FIG. 4 is a corrupted pointer dereference.
Figure 5:
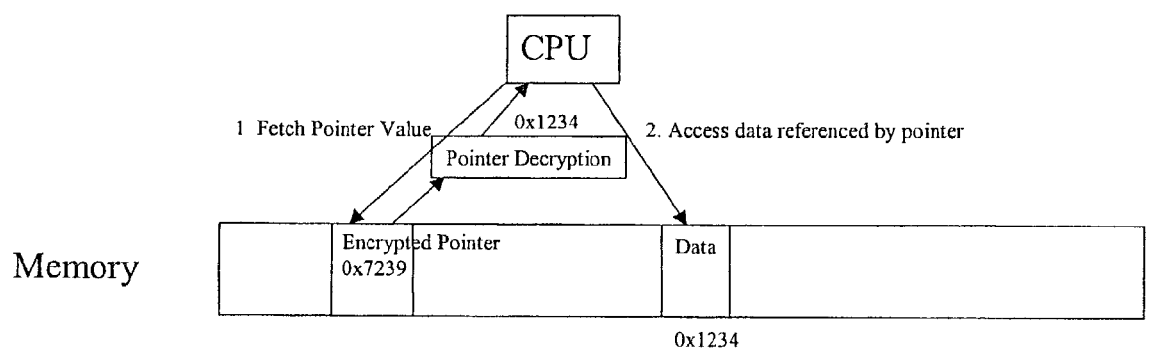
FIG. 5 is a PointGuard encrypted pointer dereference.
Figure 6:
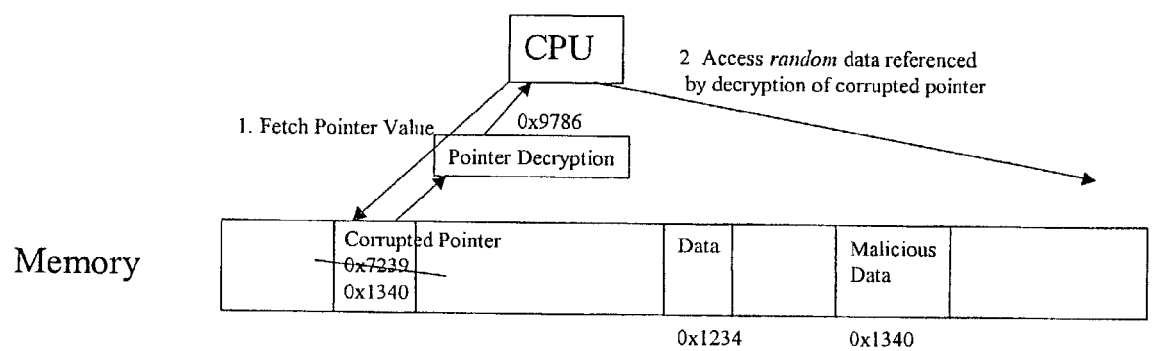
FIG. 6 is a PointGuard encrypted pointer dereference.

It is vitally important that the compiler do the encryption and decryption of pointers be consistent, i.e., that pointers are consistently encrypted at such places that they are always decrypted before use, and that only encrypted pointers are decrypted.

It is important to the security value of PointGuard that pointers are encrypted when stored in memory, i.e., storage that is addressable, and thus vulnerable to attack due to untyped memory access. CPU registers are notably not addressable, and thus the ideal method is to store pointers in the clear in registers, and encrypted in memory.

There are many possible places in the compiler to put the encryption/decryption of pointers. These options must all satisfy the "consistency" requirement, and trade off the security value against ease of implementation. The stages of program compilation where pointer encryption can be inserted are described here:

In the preprocessor: The C preprocessor reads C source code, and produces "processed" C source code (C source code without # directives and with macros expanded). It is possible to use a preprocessor (possibly C's conventional CPP preprocessor) to do a source-> source translation of programs, so that all pointer expressions are transformed to include the encryption upon setting pointer values, and decryption on reading pointer values. The advantage of this approach is ease of implementation. The disadvantage is that C macro expansion has a propensity to evaluate terms in an expression multiple times, which could cause problems if it results in pointer values being decrypted twice. More powerful C preprocessors (C source-to-source translators) exist, but the problem remains that the output is C code, which the rest of the compiler is free to interpret as it wishes with respect to CPU register allocation.

In the parser: The parser reads C source code and emits an Abstract Syntax Tree (AST). The compiler then performs architecture-independent manipulations on the AST. One of the manipulations performed on the AST can be to insert code to encrypt and decrypt pointer values when they are set and read, respectively. The advantage to this method vs. the preprocessor is that it avoids the duplicate expression problem, and can be more efficient. The disadvantage to this method is that it may leave decrypted pointer values in the form of temporary terms in main memory.

In the code generator: Portable compilers (those supporting more than one CPU architecture) use both an abstract and a concrete representation for code generation: the abstract representation models some ideal CPU architecture suitable for general code generation, and the concrete representation maps the abstract representation to a specific CPU architecture. In the GCC compiler, the abstract representation is called Register Transfer Language (RTL). The GCC Code Generator reads AST and RTL instructions. As above, maximal security protection is provided if pointer values are only decrypted while in the CPU's registers. RTL is the highest stage at which registers become visible: registers are abstractly visible in RTL, presented as an infinite bank of virtual registers. This allows more precision in expressing the PointGuard transformation than in the stages above (because registers are visible) but less precision than working on actual machine code in the architecture-specific optimizer. This transformation would transform RTL instructions to load pointer values from memory into virtual registers to add the decryption, and would transform the saving of pointer values from virtual registers to memory to add encryption. Compilers other than GCC use other intermediate representations, with similar properties.

In the architecture-specific optimizer: The architecture-specific optimizer reads RTL and emits machine code. As above, maximal security protection is provided if pointer values are only decrypted while in the CPU's registers. This transformation would transform actual machine instructions to load pointer values from memory into real registers to add the decryption, and would transform the saving of pointer values from real registers to memory to add encryption. For this to work, the transformer must track which values are pointers and which values are other kinds of data, so that the encryption/decryption is only applied to pointer values moved to or from memory.

Shared Libraries and Mixed Code

The above methods will work if all code in a system follows the same procedure. However, in practice it is desirable to run mixed code: either PointGuard-protected code running on a system with non-PointGuard shared libraries, or vice versa. This is important in practice because shared libraries (also known as DLLs: Dynamic Link Libraries) are an essential part of modern operating systems. If mixed code is naively linked together, then pointer values will be passed encrypted and used without decryption (or vice versa) resulting in program crashes. To address the mixed code problem, some form of interfacing is necessary to allow PointGuard code to link with non-PointGuard shared libraries, and vice versa:

PointGuard libraries and non-PointGuard programs: Programs make calls to libraries, but not vice versa. To accommodate this situation, the library must be prepared to link with programs that have never heard of PointGuard. This can be done by modifying the libraries to export both PointGuard and non-PointGuard versions of the library's functions. The non-PointGuard function names would be the standard names (e.g., printf) while the PointGuard function names would be "mangled" in a deterministic way to make them accessible to PointGuard programs. Programs compiled with PointGuard, in turn, would seek out the mangled library function names instead of the standard function names.

PointGuard programs and non-PointGuard libraries: The non-PointGuard libraries will only provide non-PointGuard function interfaces. Therefore, any PointGuard programs will need to provide their own marshalling functions that accept standard library calls, decrypt pointer arguments, and then make calls to the non-PointGuard libraries.

A similar problem exists for system call interfaces in which the user program passes pointers (or structures containing pointers) to the kernel via a system call. As in the case of PointGuard code and non-PointGuard shared libraries, a translation layer must be provided that decrypts the pointer arguments as they are passed to the kernel. The translation layer can be provided either in the libc library (which conventionally provides a convenient interface to actual system calls) or can be performed by the kernel itself (if the kernel is aware of the prospect of PointGuard programs).

The problem of mixed code can also be approached by taking advantage of particular ways of encrypting the pointers. If the "XOR with random canary" approach is used, then exactly when the canary is initialized to a random value becomes important:

At program load time: This is the expected "normal" mode of operation. The canary value is initialized to some random value at the time each program starts up. In this case, all of the above issues of mixed code apply At system boot time: If the entire system (per CPU, per machine, or collection of machines) all use the same canary value, chosen at the time the system boots, then the above problem of mixed code disappears, because all programs see encrypted pointers in the same way, decrypting the pointers with the same key. The disadvantage of this approach is that it leaves the system vulnerable to leaking the canary value. Once started, the canary value cannot be changed (it would re-introduce the mixed code problem) and the uptime of some systems can be months or years, which is too long for a simple 32 bit key, because it is feasible for an attacker to exhaustively search a 32-bit key space in a matter of days. Thus a system employing this approach would have to be re-booted approximately daily to preserve the security value of PointGuard.

Adaptively choosing the canary value: If the canary is to be set at program load time, the initialization can scan the code being dynamically linked together. If all of the code to be linked together is PointGuard code, and a sufficient set of translators for system calls is present, then the canary value is set to a random value. However, if one or more non-PointGuard program segments is present, then the canary value is initialized to zero. This exploits the special property that any value i XOR'd with 0 is i, i.e., unchanged. Thus if any incompatible mixed code is linked together, the zero canary will have no effect, and the program will operate normally, i.e., with unencrypted pointer values, although without PointGuard security protection. The one limitation to this method is that late dynamic linking (linking in libraries after the program has started running) cannot be taken into account. Thus if a program initialized a random canary value, and subsequently tried to dynamically link to a non-PointGuard library, the attempt to link to the library would have to report an error, and the link could not happen.

Protecting the Canary

The lynch pin to the PointGuard protection system is the encryption key (the canary). If the attacker can corrupt the canary value (especially by setting it to be all zeros) then PointGuard is effectively turned off. Thus the integrity of the canary must be protected. Various protection methods can be employed to protect the canary, including:

Put the canary on a separate page

Mark that page read-only

Surround the canary page with "red pages" (pages not mapped as valid in virtual memory) so that attempts to overflow onto the canary's page will force a segmentation fault All of these protections can be un-done if the attacker can get malicious code to execute in the victim process's address space. However, getting malicious code to run in the victim process's address space is the goal the attacker is trying to achieve in the first place; if the attacker had that capability, then they would not need to corrupt the canary. Rather, the attacker needs to corrupt the canary (or otherwise defeat PointGuard) to get malicious code to run. So we presume that they have not yet achieved this goal, and thus cannot readily undo the protections.

It will be obvious to those having skill in the art that many changes may be made to the details of the above-described embodiments without departing from the underlying principles of the invention. The scope of the present invention should, therefore, be determined only by the following claims. Again, the term PointGuard as used in the above description should be read as a broad reference to any method or apparatus that embodies or implements one or more aspects of the present invention; it is not a limitation to the commercial product having that name.

The invention claimed is:

1. A method of protecting an application computer program during execution outside of a special environment against pointer corruption attacks, the application computer program implemented using the C programming language, the method comprising the steps of:
    identifying a function;
    implementing a protected version of the function, the protected version of the function including:
        encrypting values of all data pointers each time the values of the data pointers are modified; and
        decrypting the encrypted value of at least one data pointer before use each time the data pointer is read; and
    exporting the protected version of the function and an unprotected version of the function,
    wherein said encrypting and decrypting steps are effected by instructions generated by a compiler during compilation of the said program.

2. A method according to claim 1 wherein said encrypting and decrypting steps are effected by XOR'ing the data pointer with a predetermined encryption key value.

3. A method according to claim 2 including selecting the key value at random.

4. A method according to claim 2, further comprising storing the encryption key in read-only memory to protect the encryption key from tampering.

5. A method according to claim 1 including storing the data pointer values in the clear only in CPU registers and storing the encrypted values of the data pointers in addressable memory.

6. A method according to claim 1 wherein instructions to implement said encryption and decryption steps are inserted into the program in a preprocessor.

7. A method according to claim 1 wherein instructions to implement said encryption and decryption steps are inserted by a compiler during manipulation of an intermediate representation of the program.

8. A method according to claim 1 wherein instructions to implement said encryption and decryption steps are inserted by a compiler in the context of an architecture-dependent representation by transforming instructions to load data pointer values from memory into registers to add the decryption instructions, and transform the saving of data pointer values from registers to memory to add the encryption instructions.

9. A method of protecting an application computer program during execution outside of a special environment against pointer corruption attacks, the application computer program implemented using the C programming language, the method comprising the steps of:
   identifying a function;
   implementing a protected version of the function, the protected version of the function including:
      encrypting values of pointers each time the values of the pointers are modified; and
      decrypting the encrypted value of at least one pointer before use each time the pointer is read; and
   exporting the protected version of the function and an unprotected version of the function,
   wherein said encrypting and decrypting steps are effected by instructions generated by a compiler during compilation of the said program.

10. A method according to claim 9 wherein said encrypting and decrypting steps are effected by XOR'ing the pointer with a predetermined encryption key value.

11. A method according to claim 10 including selecting the key value at random.

12. A method according to claim 10 further comprising storing the encryption key in read-only memory to protect the encryption key from tampering.

13. A method according to claim 9 including storing the pointer values in the clear only in CPU registers and storing the encrypted values of the pointers in addressable memory.

14. A method according to claim 9 wherein instructions to implement said encryption and decryption steps are inserted into the program in a preprocessor.

15. A method according to claim 9 wherein instructions to implement said encryption and decryption steps are inserted by a compiler during manipulation of an intermediate representation of the program.

16. A method according to claim 9 wherein instructions to implement said encryption and decryption steps are inserted by a compiler in the context of an architecture-dependent representation by transforming instructions to load pointer values from memory into registers to add the decryption instructions, and transform the saving of pointer values from registers to memory to add the encryption instructions.

* * * * *